Feb. 28, 1950   N. A. ESPEGREN   2,498,915
GASKET UNIT FOR SWIVEL CONNECTIONS
Filed Feb. 2, 1948

INVENTOR.
Nels A. Espegren
BY
ATTORNEYS.

Patented Feb. 28, 1950

2,498,915

UNITED STATES PATENT OFFICE 2,498,915

GASKET UNIT FOR SWIVEL CONNECTIONS

Nels A. Espegren, Omaha, Nebr.

Application February 2, 1948, Serial No. 5,731

3 Claims. (Cl. 285—96.8)

This invention relates to gaskets for swivel joints for steam lines and other pressure conduits.

To connect steam lines between successive railway cars in a train recourse has been had to connectors which must swing through a considerable angle and therefore require a steam tight swivel joint. The joint customarily used comprises a cylindrical nipple which fits and turns in a cylindrical socket and is sealed by a gasket forced against the end of the nipple and the interior of the socket by a coil compression spring confined in the socket. The spring reacts on a substantially rigid shouldered sleeve or thimble which confines the gasket.

Leakage of steam is wasteful and in freezing weather can become the source of annoyance and even danger to passengers and crew because of the formation of fog and deposition of frost. Vibration, motion due to slack action between cars, and rough handling, tend to cause severe wear.

The present invention offers an improved gasket and related thimble, which are inexpensive and afford a better and a longer lived seal. The improved gasket and thimble are intended for use on existing swivel joints, with no change other than the substitution of these improved parts.

A preferred embodiment of the invention will now be described by reference to the accompanying drawing, in which Fig. 1 is a fragmentary view in axial section showing a conventional swivel joint with the improved gasket and follower in place.

Figure 1:
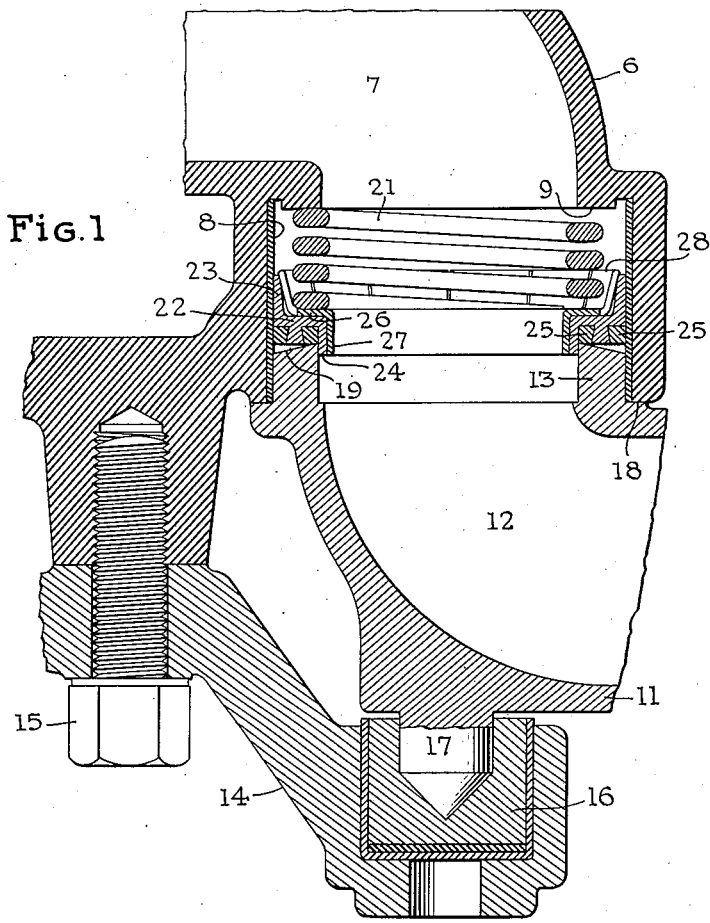
Figure 2:
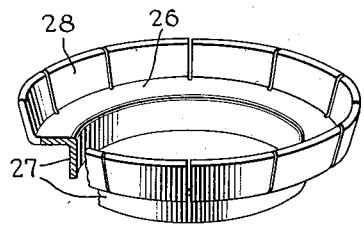
Fig. 2 is a perspective view of the follower, part being broken away to show the cross section.

Refer to Fig. 1. The socket member of the swivel joint is indicated generally by the numeral 6. It has a steam passage 7 leading to the socket which has a bushing 8 forming the wearing surface of the socket proper and a shoulder 9 which serves as a spring seat.

The nipple member of the swivel joint is generally indicated by the numeral 11 and has a steam passage 12 which communicates through the end of nipple proper 13 with the interior of socket bushing 8 and thus with passage 7 in member 6.

A bracket 14 is releasably secured to socket member 6 by means including a machine screw 15 and carries a thrust bearing 16 which receives pivot lug 17 formed on member 11. The axes of lug 17 and nipple 13 coincide and the nipple has a shoulder 18 seating on the socket member 6, so that nipple 13 turns smoothly in socket bushing 8. The end 19 of nipple 13 is beveled as indicated and the packing structure which is seated on end 19 is loaded by a coil compression spring 21 seated on shoulder 9.

The parts so far described will be recognized as conforming in detail to past practice. The beveling of end 19 was intended to cause the gasket to be wedged outward against bushing 8, and to a limited extent did have that effect, but the old type thimble was approximately rigid and the gaskets wore and scoured where leakage occurred, so that their performance has never been wholly satisfactory.

Figure 3:
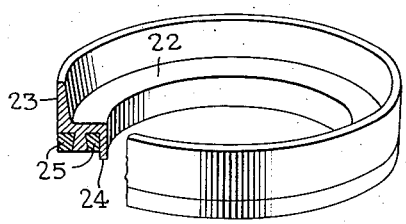
Fig. 3 is a perspective view of the gasket, part being broken away to show the cross section.

According to the present invention the gasket is formed with a body 22 which overlies the beveled end 19 and has two annular (generally cylindrical) flanges 23 and 24. The flange 23 which generally resembles a flange used in prior art gaskets, is slightly tapered in thickness and seats uniformly on bushing 8. The flange 24, for which no precedent existed in the prior art gasket extends within and fits the interior of nipple 13. The gasket, including its flanges is of any suitable, heat-resisting flexible composition. Wear rings 25 of soft metal, or of composition harder than the gasket, may be molded in the gasket as shown in Figs. 1 and 3, but the use of such rings is by no means indispensable.

An examination of Fig. 1 will make clear that the body 22 of the gasket does not seat over the entire area of end 19. When first installed it seats only on an annular area near the inner margin of end 19. Later it wears in to some extent and also deforms under spring pressure because of the nature of the thimble or follower used, so that the area of engagement with end 19 increases with wear and continued spring thrust.

The spring follower or thimble has a plane annular middle portion 26 with a rigid inner marginal flange 27 projecting in one direction and an expansible flaring flange 28 projecting in a generally opposite direction from its outer margin. To render flange 28 flexible and expansible it is slotted as shown. It thus may be described as dentated.

The plane portion 26 of the follower overlies the body 22 of the gasket and receives the thrust of spring 21. The inner flange 27 overlies the bore of gasket body 22 and flange 24 confining and centering these parts and protecting them from the scouring action of flowing steam. The flaring dentated outer flange 28 engages gasket flange 23 and holds it yieldingly in contact with socket bushing 8 throughout the entire periphery of the gasket flange.

The rigid inner flange 27 greatly stiffens the flat annular portion 26 and constrains it to annular flexure under the thrust of spring 21, this flexure tending to spread dentated flange 28, and being occasioned by the support of gasket body 22 chiefly near its inner margin.

As the gasket wears the expansion of dentated flange 28 holds gasket flange 23 in sealing contact. Thus the gasket is closely confined and protected and all wear is followed up.

What is claimed is:

1. A sealing unit for use in a swivel joint of the type in which a bevel-ended tubular nipple swivels in a cylindrical socket and is sealed by a gasket held against the end of the nipple and the wall of the socket by a coil compression spring, said unit comprising an annular gasket having a body portion dimensioned to overlie the end of the nipple and having a flexible inner marginal flange dimensioned to extend into and fit the interior of the nipple and a flexible outer marginal flange dimensioned to fit the interior of the socket; and an elastic metal follower formed with a flat middle annulus adapted to overlie the body portion of the gasket and transmit thereto the thrust of the spring, said annulus having two flanges, the first a comparatively rigid inner flange which overlies and confines the first-named gasket flange, and the second a flexible dentated outer flange adapted to act yieldingly to expand the second named gasket flange.

2. The combination defined in claim 1 in which the annular body portion of the gasket is formed with at least one annular insert harder than said body portion and adapted to coact with the end of the nipple.

3. A sealing unit for use in a swivel joint of the type in which a bevel-ended tubular nipple swivels in a cylindrical socket, and is sealed by a gasket held against the end of the nipple and the wall of the socket by a coil compression spring, said unit comprising an annular gasket having a body portion dimensioned to overlie the end of the nipple and having a flexible outer marginal flange dimensioned to fit the interior of the socket; and an elastic metal follower formed with a flat middle annulus adapted to overlie the body portion of the gasket and transmit thereto the thrust of the spring, said annulus having two flanges, the first a comparatively rigid inner flange which overlies the inner surface of the gasket and extends into the bore of the nipple, and the second a flexible dentated outer flange adapted to act yieldingly to expand the outer marginal flange of the gasket.

NELS A. ESPEGREN.

REFERENCES CITED

The following references are of record in the file of this patent:

UNITED STATES PATENTS

| Number | Name | Date |
|---|---|---|
| 494,402 | Walsh | Mar. 28, 1893 |
| 1,346,425 | Roth | July 13, 1920 |
| 1,843,927 | Manchester | Feb. 9, 1932 |